Figure 4:
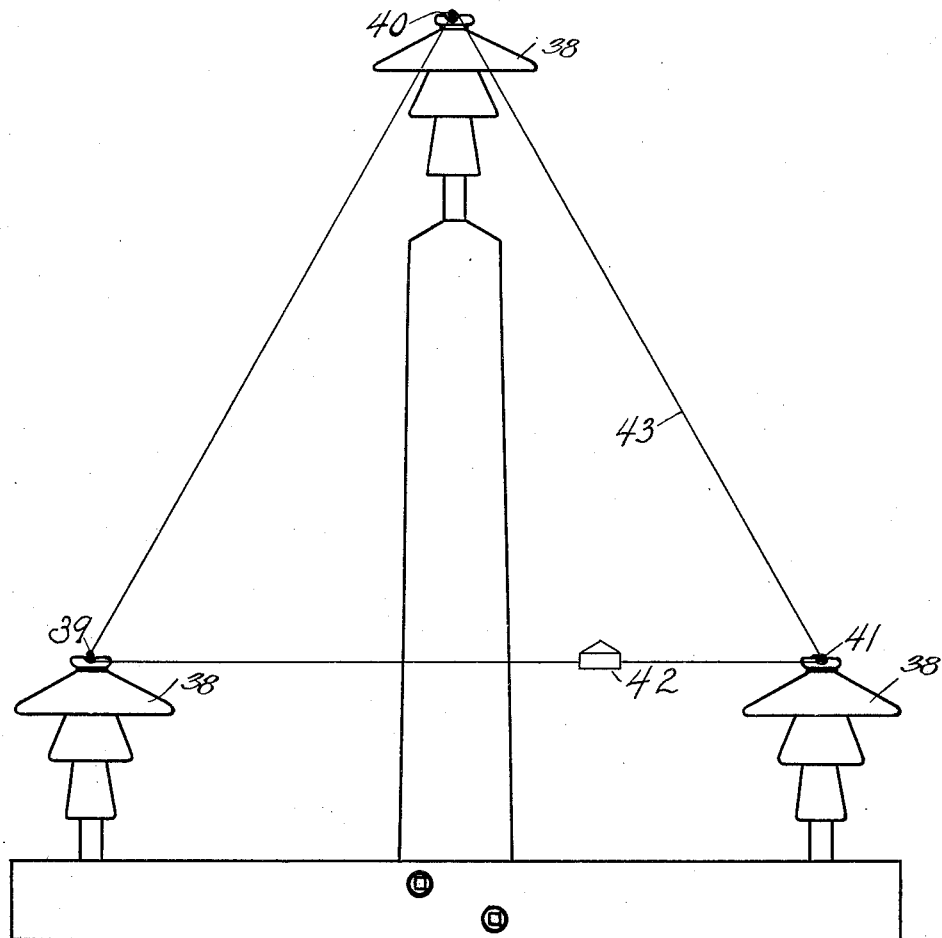

L. T. HATFIELD.
ELECTRIC CURRENT CONTROL SAFETY DEVICE.
APPLICATION FILED MAR. 6, 1911.
1,101,127.
Patented June 23, 1914.
4 SHEETS—SHEET 1.
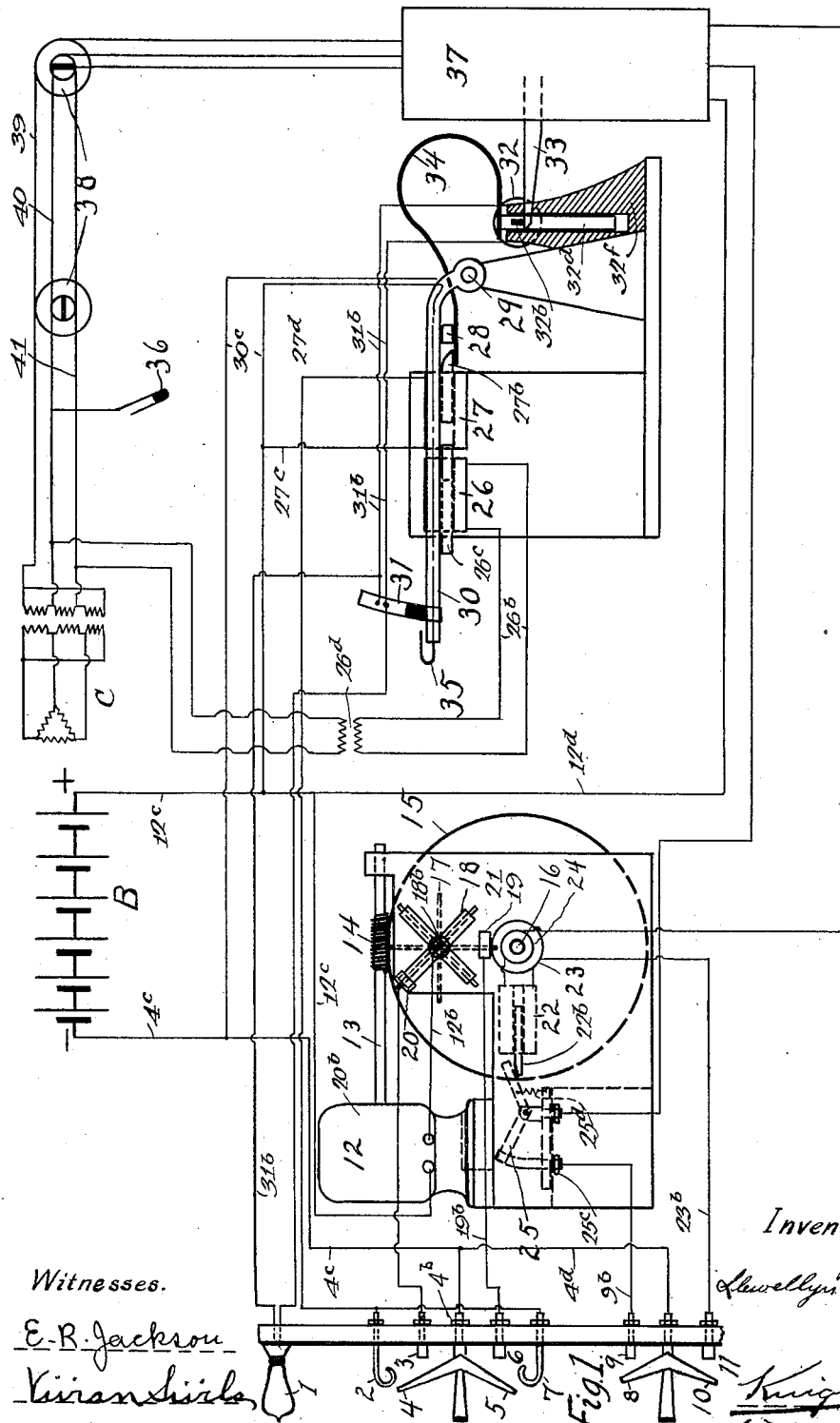
Witnesses.
E. R. Jackson
Inventor.
Llewellyn T. Hatfield
Knight Bros
his Attorneys L. T. HATFIELD.
ELECTRIC CURRENT CONTROL SAFETY DEVICE.
APPLICATION FILED MAR. 6, 1911.
1,101,127.
Patented June 23, 1914.
4 SHEETS—SHEET 2.
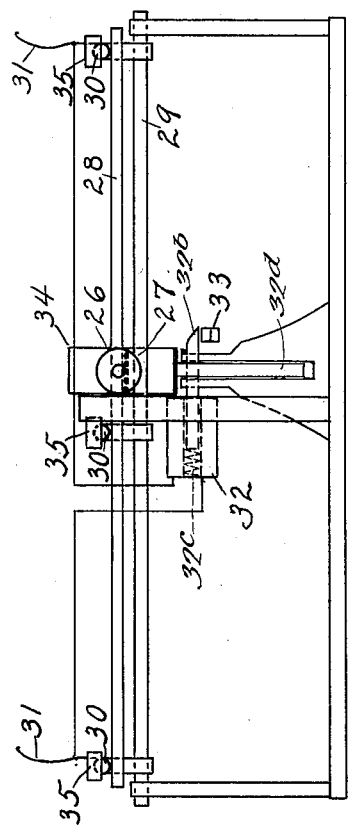
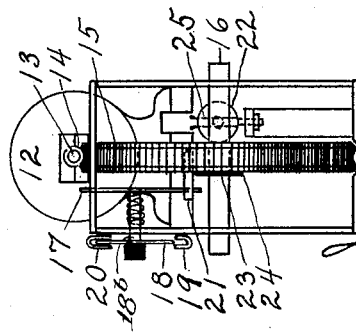
Witnesses.
E. R. Jackson
Vivian Livily
Inventor
Llewellyn T. Hatfield
Knight Bros.
his Attorneys L. T. HATFIELD.
ELECTRIC CURRENT CONTROL SAFETY DEVICE.
APPLICATION FILED MAR. 6, 1911.

1,101,127.

Patented June 23, 1914.
4 SHEETS—SHEET 3.

Witnesses.
E. R. Jackson
Vivian Sivils

Inventor.
Llewellyn T. Hatfield
Knight Bros
Attorneys

L. T. HATFIELD.
ELECTRIC CURRENT CONTROL SAFETY DEVICE.
APPLICATION FILED MAR. 6, 1911.
1,101,127.
Patented June 23, 1914.
4 SHEETS—SHEET 4.
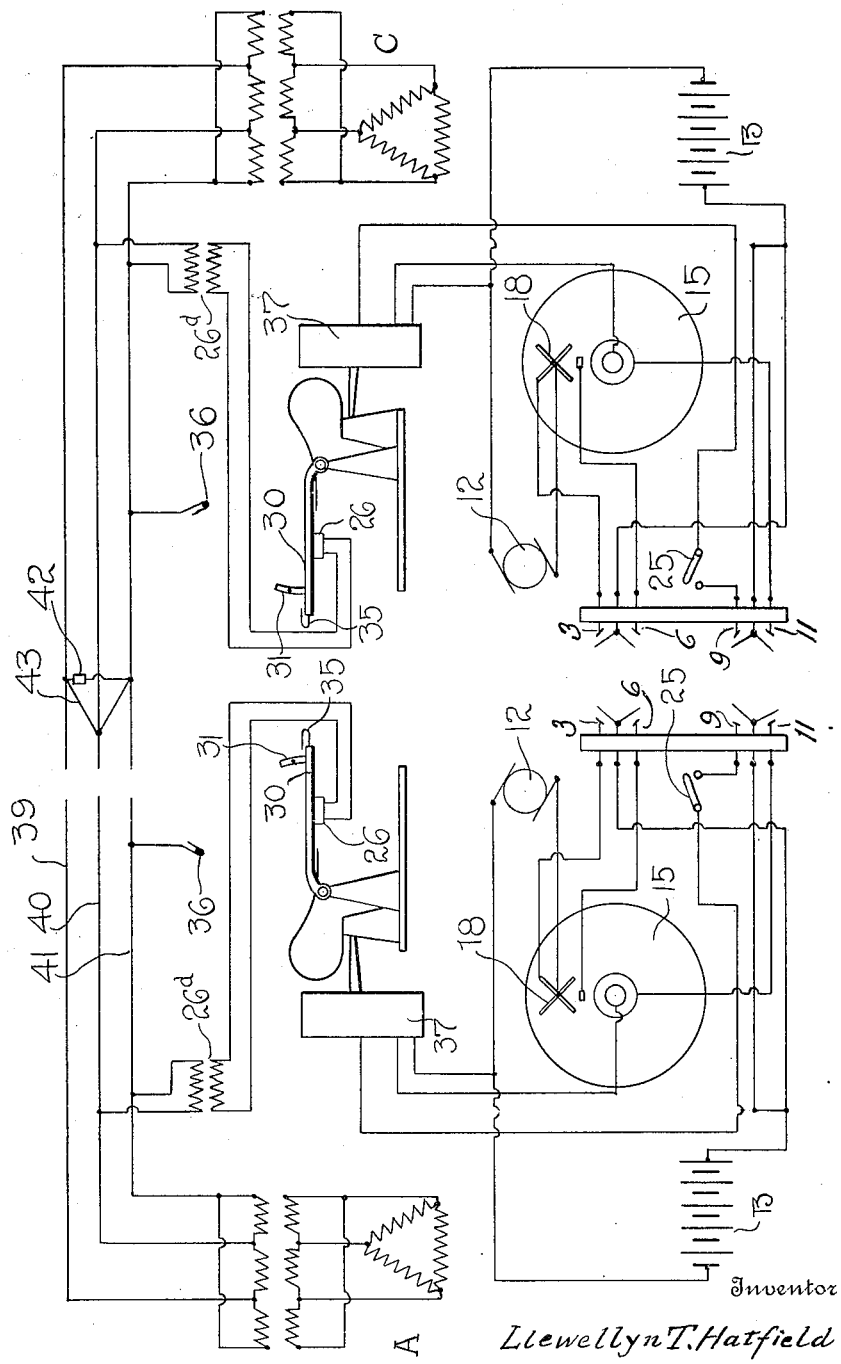

UNITED STATES PATENT OFFICE.

LLEWELLYN T. HATFIELD, OF SACRAMENTO, CALIFORNIA.

ELECTRIC-CURRENT-CONTROL SAFETY DEVICE.

1,101,127.  Specification of Letters Patent.  Patented June 23, 1914.

Application filed March 6, 1911. Serial No. 612,706.

*To all whom it may concern:*

Be it known that I, LLEWELLYN T. HATFIELD, a citizen of the United States, residing at Sacramento, in the county of Sacramento and State of California, have invented certain new and useful Improvements in Electric-Current-Control Safety Devices, of which the following is a specification.

It is common knowledge that there is now throughout the world, and particularly in the United States of America, a large number of lines for the transmission of electricity by wire, and that such transmission involves the carrying of currents of excessively high voltage, and that it is highly dangerous to human beings to come in contact with wires carrying such currents, and that by reason of the nature of electric currents its presence is difficult of ascertainment except by physical risk, and there is at this time no provision made for informing persons handling "dead" wires, of the imminence of the presence of electric energy.

I claim to have discovered a safe-guard for the inadvertent or negligent charging of wires with current of high potentiality, which wires are being handled or treated by persons, without information as to the coming of such current, while they are so handling or working with it.

It being known that it is common practice for producers of and dealers in electric energy to have different lines for transmission of electric energy, some of which may be in operation, and others "dead" and harmless, and that the workmen outside of the power station or stations where currents may be switched to and from different lines, are practically always away from means of communication as to the movement of persons in the power or switching stations with respect to the use of such "dead" lines, and at any moment, by reason of demand of change to or from some other line, it is common occurrence that men have been greatly injured and in many instances killed by reason of the carelessness of station operators in overlooking the fact that men were working on such "dead" line.

It is the usual practice in switching stations to hang on the switching lever or device, placards bearing the words, "Men at work on lines. Do not turn on current", or similar indications of the presence of workmen, but notwithstanding such provision and other kindred notations, men are continually being killed and injured by reason of the forgetfulness, ignorance or carelessness of station operators, and there is nothing at this time that makes provision for the warning of men working on "dead" lines, of the approach of dangerous charges of electricity.

I claim for this invention, certainty of warning to persons working on wires by the use of the device shown in the drawings attached hereto and made part hereof, or by other devices easily constructible by those skilled in mechanical devices, for use in power stations to have the following effect: That switching devices on the regular panel or switching board shall be so connected with a motor operated from a storage battery or other supply of such voltage as shall be harmless to human beings. That when lines are "dead" for any purpose, whether men are working on the line or not, that a high potential current cannot be turned on to such wires until there has first been thrown on such wires a low potential direct current of such magnitude as will energize the wires to the extent of igniting and firing a detonating torpedo placed upon the transmission lines in connection with a fusible wire so that the presence of a voltage of two hundred or other harmless voltage will discharge such torpedo, making a noise sufficient to be heard from two hundred to five hundred feet, and the presence of such low voltage current will also impart to the bare hands of the workmen, if working barehanded, the fact that such low voltage is on the wire, and such knowledge will carry with it the further information that such low voltage will be immediately followed by a dangerously high potential current. It being intended that the appliance for switching the low current on shall continue for say not less than thirty seconds or for such other length of time as good practice will permit, and the devices shown in the drawings herewith make provision for the charging of the wires with low potential and the withdrawal of that current before the high potential can be carried on to the wires at all, and a reading of the description of the parts and of the purposes thereof will show to persons skilled in the art of electrical machinery the object and purpose, and the mode of procuring results. It is also contemplated that the automatic throwing in of the high potential current may be eliminated, and that devices provided for be made to operate from the front of the panel or switch-board to accomplish the same purpose, and to throw on the low potential current precedent to charging with the high potential, with sufficient lapse of time to enable workmen to escape from contact with the high potential current by the time it reaches them.

The primary purposes of the invention are to prevent injury to human life or person, for economical reasons, and for certainty of operation with safety.

It is not intended to claim that the construction shown in the drawings shall limit my invention, as that is but one embodiment selected for the purposes of illustration.

It will be understood of course, that the operation on the part of the workmen on the transmission line will be to place the fusible wire around the transmission wires and attach the detonating torpedo, one or more, for their own protection. It is also practicable to arrange a mechanical device to work in connection with the front of the panel or switch-board in connection with the levers or other devices for switching the high potential current on to the transmission line in such manner as will interfere with and prevent the instantaneous energizing with a high potential current on the wires that have been dead until there has been the same lapse of time as is provided for in the following description and statement including the throwing of the low potential current on to such transmission lines, preliminary to charging with high potential current. Such arrangement includes mechanically arranged devices to reconnect the appliances so that there can be no leaving the line open to the judgment or recollection of the operator, and in such manner accomplish all of the purposes contemplated by my invention, such appliance to be in harmony with good mechanical practice in connection with electrical mechanism and be so handled that workmen on dead lines cannot be injured or interfered with, without proper warning.

In the drawings:—Figure 1, shows a diagrammatic side elevation of the device; Fig. 2, an end elevation showing the motor and time apparatus as seen from the middle part of Fig. 1, and looking to the left; Fig. 3, is an end elevation of the contacting device as seen from the middle part of Fig. 1 and looking to the right of said figure; and Fig. 4, shows a high tension transmission line fitted with an explosive torpedo. Fig. 5 shows diagrammatically the main line connected with two high potential current stations, each station, as is preferable where there are more than one, being provided with a complete apparatus of the present safety device.

In Figs. 1 and 2 is shown a pilot lamp 1, a pair of spring contact points 2 and 7, a pair of switch blades 4 and 5 with corresponding contacts 3 and 6. These switch blades 4 and 5 serve the purpose of charging the main line 39, 40, 41 with low potential current. Another pair of switch blades 8 and 10 with corresponding contacts 9 and 11 are supplied for the purpose of switching the low potential current into the motor or other device used to operate the high potential and switch 37. An 1800 R. P. M motor 12 having an extension shaft 13 is mounted close to the switches just described. And the shaft 13 carries a worm 14 constructed to intermesh with a gear wheel 15 mounted on a shaft 16. Slip rings 23 and 24 are secured to shaft 16 to be referred to hereinafter. Pivotally mounted to one side of the gear wheel 15 is a four blade copper switch 18, the blades of which are situated 90° apart. Eight tripping fingers 17, are mounted coaxially on a copper shaft $18^b$ of the switch 18 in the path of which are positioned contacts 19 and 20 spaced apart an angle of 135°, so that the switch blades alternately contact with one or the other of said contacts. The gear wheel 15 carries tripping pin 21 situated so as to be able to impinge against one of the tripping fingers 17 once during a complete revolution. The switch 18 will therefore be switched from one to the other of the contacts 19, 20, once for each revolution of gear wheel 15. By means of a conductor $12^c$ the motor 12 is connected with the positive end of the storage battery B on the direct current generator. The other side of the motor is, by means of the conductor $12^b$ connected with the copper cylinder $18^b$ of switch 18. The conductor $20^b$ connects the switch contact 3 with the contact 20, and a contact 6 is connected with the contact 19 by means of the conductor $19^b$. A solenoid is electrically connected to the slip rings 23 and 24 respectively, whereby the core $22^b$ of the solenoid is energized to operate a supplementary switch 25, said switch being in the control circuit of a high tension oil switch 37.

In Figs. 1 and 3 is illustrated a line contact device by means of which a low potential current is thrown on the main line when the latter is carrying no current. This device is provided with a solenoid 26 which is energized at all times when the main high tension line is carrying a current; 27 is another solenoid of less strength, which is only energized when the switch blades 4 or 5, see Fig. 1, are brought in contact with the spring points 2 and 7. These two solenoids will be more fully described hereinafter.

The shaft 29, preferably made of hard wood, mounted in a suitable stand, carries three arms 30 situated in the same transverse plane, and which are journaled to oscillate with or on said shaft and are connected so as to be raised or lowered together by a cross beam 28 which also may be made of wood. Through the center of each of the arms 30 is drawn a copper conductor $30^b$ connected with the storage battery B, and this conductor terminates in a spring contact 35 of copper, situated at the free end of each arm 30. When the arms are raised by a suitable spring, these contacts 35 will be brought into contact with the three contacting points 36, Fig. 5, provided in the main high tension line 39, 40, 41, thereby connecting the low potential circuit over the wires $30^b$, $30^c$ from the battery B with the main high tension line, which previously to that is supposed to be uncharged. With this main line is connected an oil switch 37, which oil switch is electrically controlled by a motor 12 or other device connected with the battery B, through wires $4^c$, $4^d$ and $12^c$ $12^d$. Permanently attached to one of the plungers in this switch 37 is an arm 33, projecting outwardly from the oil switch in the direction of the line contact device. A spring 34, suitably mounted, engages with the cross beam 28 so as to be able, when released, to raise the arms 30 until the contacts 35 and 36 touch. The solenoid 27 has a projecting core $27^b$ which is adapted to interlock with the spring 34, so that the spring can be released or contacts made between the points 35 and 36 when the core $27^b$ is retracted in the solenoid 27 by the action of current through its conductor $27^c$. This solenoid is connected to the positive end of the storage battery B, and through its conductor $27^a$ is connected with the spring contact points 2 and 7. This solenoid can therefore only be energized when switch blades 4 or 5 are in contact with the spring contact points 2 and 7, respectively.

The solenoid 26, which by means of its conductors $26^b$ is so connected to the main line by means of a "step-down" transformer $26^d$ that it will always be energized when the main high tension line 39, 40, 41 is carrying a current. These two solenoids 26 and 27 are both in alinement, but solenoid 26 is of greater power than solenoid 27. The core $26^c$ of the former has a brass end, which is adapted to enter behind the core $27^b$ when the solenoid 26 is energized, thus preventing, on account of its greater power, any retraction of the core $27^b$ or subsequent release of the spring 34, when the main line 39, 40, 41 carries a current of high voltage. A third solenoid 32 is mounted on the under side of the spring 34 by means of a post $32^d$ in such a manner that when its plunger $32^b$ is out and rests on arm 33 it will hold the spring compressed, and when the solenoid is energized its plunger $32^b$ will be retracted against its spring $32^c$, and the spring 34 released. The post $32^d$ is slidably mounted in a stand $32^f$. Conductors $31^b$ connect this solenoid 32 with the contacts, or copper fingers 31, mounted at the end of the arms 30, but insulated from the spring points 35 and their wires $30^b$. These conductors $31^b$ also connect with the pilot lamp 1 previously referred to. It must be evident that the solenoid 32 will then be energized when the fingers 31 momentarily touch contacts 36 on the raising of the arms 30 and slightly in advance of the contacting between points 35 and 36, but only in a case that the main line 39, 40, 41 at that moment should happen to be charged. This can only be on a line with several stations, see Fig. 5, each provided with a complete safety device, where contacts 35 at one station have already thrown a low potential current on the main line. In such a case the solenoid 32 will be energized and the plunger $32^b$ in consequence retracted, thus slipping off its supporting arm 33, and as the spring is subsequently released the arms 30 will follow downward. In other words, if arms 30 should be raised by the operator at station A, see Fig. 5, this would cause contact between points 35 and 36 running low potential current over the main line 39, 40, 41 and if shortly afterward the operator at station C should raise the arms 30 of his apparatus, points 31 and 36 would then make contact leading a low potential current from the main line over wires $31^b$ to solenoid 32. Directly this solenoid has been energized its plunger $32^b$ will be retracted and the support of arm 33 for the short end of spring 34, solenoid 32 and posts $32^d$ being thus withdrawn, said parts will then slide down, bringing with them arms 30 of station C, while the arms 30 at station A still remain in upright position carrying low potential current over the main line. The arm 33, already described, with its free end, engages the plunger $32^b$ so that during the upward movement of the oil switch plunger this arm will raise the solenoid 32 by means of the plunger $32^b$, thereby compressing the spring 34.

The oil switch 37, which forms no part of the present invention and need therefore not be further described, as has already been stated is inserted in the main line 39, 40, 41.

In Fig. 4, the three conductors 39, 40 and 41 of the main line, carried by insulators 38 are shown connected by a wire 43 provided with a torpedo 42 of any suitable kind. This torpedo is to be exploded by current at about two hundred volts pressure. There is a difference of potential between the wires 39, 40, or 39, 41, or 40, 41 of such potential which is necessary to cause the explosion of the torpedo. The shunting wire 43 with the torpedo, is, of course, used on the main line only while men are working on the line supposed to be dead, and when the torpedo has been exploded by the burning of its fuse, the wire 43 detaches itself from the main line, being merely thrown around the three wires 39, 40, 41 and held together by the fuse.

In order to switch-off the high potential current on the main line, the switch blade 10 is pushed into the contact 11, thereby closing the circuit to the oil switch 37 and opening said switch. As a consequence the arm 33 attached to one of the plungers in the oil switch will be carried upward, thereby compressing the spring 34, through the intermediary of the solenoid plunger 32$^b$. On closing the switch 10—11 the same current which operates to trip the oil switch also flows through the solenoid 22 in passing over the slip ring 23, through solenoid 22 to the slip ring 24, and then to the controlling apparatus of the oil switch. This flow of the current energizes the solenoid 22 so that its plunger 22$^b$ is retracted, and the switch 25 actuated by a spring 25$^d$ is opened. As spring 34 has now been compressed, it stands ready to carry the arms 30 into contact with points 36 as soon as it has been released by the plunger 27$^b$. The high current has now been switched-off from the main line, the supplementary switch 25 stands open and the spring 34 compressed, that is, ready for action. In order now that the main oil switch 37 may be closed again, the switch 25 must first be closed.

In order to charge the main line with low potential current, the switch 4—3 is closed thereby completing the circuit from the negative side of the battery B through conductor 4$^c$, the center post 4$^b$, blade 4, contact 3, conductor 20$^b$, contact 20, blade 18, cylinder 18$^b$, wire 12$^b$, to one of the terminals of the motor 12, thence through the other terminal of the motor through the wire 12$^c$ to the positive end of the battery B. The motor 12, running at a speed of 1800 R. P. M. now drives the worm gear 14 nine hundred revolutions, while gear wheel 15 makes one revolution. While gear wheel 15 is making this single revolution, the plunger 22$^b$ picks up the handle of the supplementary switch 25, thereby closing it just an instant before the completion of this revolution. The tripping pin 21 engages with one of the eight fingers 17, which happens to be in its path, and by the time the complete revolution is made the switch blade 18 will be drawn out of connection with contact 20, and another of the blades 18 thrown into connection with contact 6 by means of contact 19 and conductor 19$^b$, when the circuit of the motor 12 will again be completed. In the operation of closing the motor circuit by bringing the switch blade 4 into connection with contact 3, the blade 4 comes momentarily in contact with spring 2. In so doing the circuit, through solenoid 27 is completed, the current passing from switch blade 4 through contact 2, wire 27$^d$ and then back through wire 27$^c$ to the opposite side of the battery B. The solenoid being now energized withdraws its plunger 27$^b$, thereby releasing the spring 34, which in turn carries the arms 30 until the contacts 35 and 36 close. A current of low potential of the desired voltage has thereby been thrown on the main line. This low potential current will remain on the main line for at least one half a minute before the high voltage current can possibly be thrown on, for the reason that the circuit through solenoid 27, which allows arms 30 to be carried in contact with the line, has closed before the motor circuit is closed; and the main oil switch 37 can not be closed until the supplementary switch 25 is closed. This switch 25 cannot close in less than a half minute as long as the 1800 R. P. M. is used together with the gearing, as described above. As soon as the switch 25 has been closed at the end of one revolution of the gear wheel 15, all that now remains to be done to throw the high voltage on the main line 39, 40, 41 is to close the switch 8—9 as is usual in closing the main oil switch. When the oil switch 37 is closed the arm 33 will be carried down by the plunger of the oil switch, thereby releasing the inner end of the spring 34, which then is no longer powerful enough to maintain the arms 30 in upright position. On the falling of the arms 30, the contact 35—36 will be broken and the low potential current switched off the main line, whereupon the apparatus is again ready to go through the same routine. In case the operator at station A should close his switch 4—3, 5—6 and the operator at station C has closed his switch just ahead of the operator at station A, the operator stationed at C has then already put the low potential current on the main line, and when the spring 34 of the apparatus at station A lifts the arms 30, the fingers 31 will then be brought in contact with the main line contacts 36, whereupon the low potential current already on the main line from station C will energize solenoid 32 at station A, thereby retracting its plunger and releasing spring 34, so that arms 30 at station A will fall back in their original position. As the fingers 31 are also connected with the lamp 1, the lamp at one station will then always light up if the operator at another station has already put the low potential current on the main line.

Solenoid 26 is introduced for the purpose of preventing the arms 30 from ever being released in case the main line 39, 40, 41 carries a high voltage current, or for the purpose of synchronizing. This solenoid 26 is so connected that whenever the high voltage current is on the main line it is always energized, as has already been described; and the solenoid 26 being stronger than the solenoid 27 the latter will always be locked by the former when the high voltage current is on the main line. Thus the apparatus cannot be thrown on a live line.

From the above description it will be evident that this apparatus will prevent any operator from throwing a high potential current on the main line in less time than a half minute. It also enables the operator to thrown-in the main oil switch 37 at any time it may be desired after a lapse of one half a minute. The low potential current remains, however on the main line until the main oil switch is closed, after the operator has once closed switches 4—3 and 5—6.

Synchronism can be accomplished as readily with this apparatus in the circuit as without it.

I claim:

1. A system of transmitting electrical energy over a line, including a source of high potential current, a source of low potential current, a switch for throwing in current on said line from said low potential source, a signal, a wire in shunt on said line to operate the signal a predetermined period prior to the flow over the line of a current of high potential, said signal actuated by a low potential current on the line.

2. A system of transmitting electrical energy over a line, including a source of high potential current, a source of low potential current, an automatic switch and a hand operated switch both coöperating for throwing on and off low potential current on the line, an intermittently running motor actuating said automatic switch, said motor being driven by said low potential source, a signal connected with said line, and means for maintaining low potential current for a predetermined period for operating the signal and before the high potential current can be run over the line.

3. A system of transmitting electrical energy over a line, including a source of high potential current, a source of low potential current, a fusible wire in shunt on said line, an automatic switch and a hand operated switch both coöperating for throwing on and off low potential current on the line, an intermittently running motor actuating said automatic switch, said motor being driven by said low potential source, an audible signal connected with said wire, and means for maintaining a low potential current for a predetermined period while operating said signal and prior to the flow of current of high potential over the line.

4. A system of transmitting energy including a source of high potential current and a source of low potential current, a signal, a switch for throwing-in a low potential current to operate the signal, a motor operated by said low potential current when said switch is closed, said motor stopping automatically after having run a predetermined length of time, and a switch operated by said motor which switch is in the circuit used for throwing-in the high potential current at the end of the running of said motor.

5. A system of transmitting electrical energy having transmission wires, a signal connected with said wires and several high potential current stations, including means at each station for maintaining a low potential current for operating the signal, and means comprising a safety switch coöperating with said low potential current preventing the throwing-in of the high potential current on said wires, while charged with said low potential current, and other means comprising contact points and a solenoid preventing one station from throwing-in a high potential current on the transmission wires charged with a low potential current from another station.

6. In a system of transmitting electrical energy, the combination of transmission wires, a source of high potential current, having a main switch, and a danger signal connected with said wires, a low potential current and a switch therefor, a motor operated by said low potential current when the low potential switch is closed, a supplementary low potential switch operated by said motor which switch is in the circuit used for throwing-in the high potential current switch, said signal being operated by said low potential current, and said supplementary switch being closed after the operation of said signal.

7. A combination with transmission wires for electrical energy and a signal connected with said wires, a source of high potential current, of a low potential switch, a main high potential switch and a supplementary low potential switch, a motor governed by said first low potential switch and controlling said supplementary low potential switch, and a low potential storage battery for operating said motor, said signal being operated by the current from said battery when the said first low potential switch is closed.

8. The combination with transmission wires for electrical energy and a source of high potential current, of a low potential switch, a main high potential switch and a supplementary low potential switch, a motor governed by said first low potential switch, and controlling said supplementary switch, a low potential storage battery for operating said motor, and a signal connected with said wires operated by the low potential current when the said first low potential switch is closed and in advance of the closing of said supplementary switch.

9. In a signal system the combination with a motor, a source of low potential current for operating said motor, a worm actuated by said motor, a gear wheel in mesh with the worm, electrical transmission wires and a signal connected with said wires, tripping fingers spaced 45° apart, switch blades revolubly mounted 90° apart on a copper cylinder, said fingers, blades and cylinder being on the same shaft, switch blade contacts spaced apart 135° or an odd multiple thereof so as to come alternately in contact with a switch blade on the advancement of said tripping fingers, a tripping pin (21) on said gear wheel to trip said switch blades, a solenoid (22) connected with said wires and mounted to revolve with said gear wheel, and a supplementary switch for said wires controlled by said solenoid, said contacts, said cylinder and said receptacles being in the motor circuit.

10. In a signal system the combination with electric transmission wires, a motor, a source of low potential current for operating said motor, a source of high potential current for said transmission wires, a gear wheel operated by said motor, of a signal connected with said wires, tripping fingers, a shaft for said fingers, switch blades also mounted on said shaft, switch blade contacts situated to be alternately in contact with one of said blades, said contacts, said shaft and said receptacles being in the motor circuit, a tripping pin secured on said gear wheel and co-acting with the tripping fingers to trip said blades, slip rings on the gear wheel connected with said low potential source wires, a solenoid electrically connected with said slip rings, and a supplementary switch for said low potential source wires controlled by said solenoid.

11. In a signal system, a low potential motor circuit, a main high potential line and a signal having electrical connection with said main line; means for throwing a low potential current on the main line for operating the signal, when said line is carrying no high potential current; said means comprising contact arms with contact points in said low potential circuit, a spring adapted to raise said arms when released, a releasing solenoid in said low potential circuit, the plunger of said solenoid adapted to normally hold said spring under compression and releasing it when energized, an interlocking solenoid energized at all times when the high tension line is carrying a current, the plunger of said interlocking solenoid when energized adapted to lock the plunger on said releasing solenoid in its normal position.

12. In a signal system, the combination with a source of high potential current and a battery of low potential current, a main high potential line, a low potential circuit for the battery and an oil switch in the main line circuit; a supplementary low potential switch, a pair of slip rings and a solenoid connected therewith, said supplementary switch being actuated by said solenoid, a safety switch in the main line actuated by said solenoid; said low potential circuit including a motor with a gearing, a four blade switch and a shaft therefor, a pair of blade contacts, said contacts also included in said low potential circuit, said gearing periodically revolving said shaft to alternately make and break the contact between the respective blades and each of said receptacles; said low potential circuit furthermore including a plurality of contact fingers adapted to make contact with the main line, oscillating arms carrying said fingers, a compressible member connected with said arms and adapted to raise them when released, a retaining solenoid in the low potential circuit the plunger of which normally engages with said compressible member and releases said member on being energized by the closing of said low potential circuit; a latching solenoid for said member, the core of which normally holds said member under compression and releases the same on being energized; said oil switch having an arm engaging said core to hold it in its normal position on the closing of said oil switch for switching-off the high potential current from the main line; and other contacting members on said arms connected to said compressing solenoid, said compressing solenoid being energized from the current on the main line when said contacting members are brought in contact therewith; a shunt wire on the main line and a torpedo adapted to be exploded by said wire on the passing of a low potential current through the main line.

The foregoing specification signed at Sacramento California this 17th day of February, 1911.

LLEWELLYN T. HATFIELD.

In presence of—
VIVIAN LIVILS,
E. R. JACKSON.